United States Patent [19]
Satagopan et al.

[11] Patent Number: 5,513,346
[45] Date of Patent: Apr. 30, 1996

[54] ERROR CONDITION DETECTOR FOR HANDLING INTERRUPT IN INTEGRATED CIRCUITS HAVING MULTIPLE PROCESSORS

[75] Inventors: Ramprasad Satagopan, Chandler; David R. Regenold, Mesa, both of Ariz.

[73] Assignee: Intel Corporation, Santa Clara, Calif.

[21] Appl. No.: 139,987

[22] Filed: Oct. 21, 1993

[51] Int. Cl.⁶ .................................................. G06F 11/34
[52] U.S. Cl. ........................... 395/185.01; 395/185.02
[58] Field of Search ..................................... 395/575, 425, 395/725, 185.02, 185.01; 371/19.1, 16.1, 15.1, 11.3, 12, 3, 68.3, 68.1

[56] References Cited

U.S. PATENT DOCUMENTS

| | | | |
|---|---|---|---|
| 3,916,112 | 10/1975 | Kalat et al. | 179/18 ES |
| 4,204,249 | 5/1980 | Dye et al. | 364/200 |
| 4,456,970 | 6/1984 | Catiller et al. | 364/900 |
| 4,750,175 | 6/1988 | Brenneman et al. | 371/22 |
| 4,933,846 | 6/1990 | Humphrey et al. | 364/200 |
| 4,937,777 | 6/1990 | Flood et al. | 364/900 |
| 5,283,904 | 1/1994 | Carson et al. | 395/725 |
| 5,327,570 | 7/1994 | Foster et al. | 395/800 |

*Primary Examiner*—Robert W. Beausoliel, Jr.
*Assistant Examiner*—Phung My Chung
*Attorney, Agent, or Firm*—Blakely, Sokoloff, Taylor & Zafman

[57] ABSTRACT

An interrupt processor controller (IPC) through which all interprocessor interrupts are routed in a complex integrated circuit. For processors which receive external interrupts, the interrupt processor controller may receive those interrupts and route those as well to the particular processor. The IPC includes interrupt routing logic which determines when a subsequent interrupt will cause an error condition with a previously instigated interrupt that has not been cleared. When such a condition occurs, a bit is set in an error detect register that is coupled to the interrupt routing logic. All of the bits of the error detect register are logically OR'ed, the output of which is routed to a single dedicated pin for indicating an interrupt error condition has occurred. This pin may have its signal routed back into the complex integrated circuit for signaling a trap handler or some other mechanism that an interrupt error condition has occurred. During debug, the error detect register may be checked to determine which bit has been set wherein each bit corresponds to a single interprocessor interrupt channel. Thus, the location of the interrupt error in the executing code can be determined and provide the system developer with important information for the debug of the system.

18 Claims, 3 Drawing Sheets

ERROR CONDITION DETECTOR FOR HANDLING INTERRUPT IN INTEGRATED CIRCUITS HAVING MULTIPLE PROCESSORS

BACKGROUND OF THE INVENTION

1. Field of the Invention

The present invention relates to the field of highly integrated chips. More particularly, the present invention concerns interrupt handling for integrated circuits containing a plurality of processors.

2. Art Background

Data processing systems in general, and microprocessors and microcontrollers in particular are commonly provided with one or more channels for sensing an interrupt. An interrupt is an event that causes a processor to make a temporary transfer of control from its current program to another program that services the event. The servicing program is referred to as the interrupt service routine (ISR), which, upon completion returns control to the previously executing program.

Interrupts may be provided upon the occurrence of various internal or external events, such as an error or fault and are the primary means by which input/output (I/O) devices obtain the services of a processor. Interrupts greatly increased the performance of a computer or control system by allowing the I/O devices direct and rapid access to the processor and by freeing the processor from the task of continually testing the status of I/O devices.

Generally, while a processor is executing the interrupt service routine for the first interrupt, the receipt of a second interrupt on the same channel by the processor may be lost. During the debug stage of the development of the processor, these situations are detected and system design is modified to prevent such an occurrance. Advances in technology have led to ever more complex integrated circuits. These advances provide for greater numbers of components on single integrated circuits. Problems arise due to these new technologies in which multiple processors are now being integrated on a single chip. In complex integrated circuits with multiple processors and peripherals there is a need for interaction between these components. Handling inter-component communication through interrupts is an efficient design solution for the above problem.

The introduction of having multiple processors on a single integrated circuit introduces a number of problems for the development of such circuits, particularly, during the debugging stage. There is a limitation to the number of signals that can be transmitted out of a given integrated circuit, dependent on the cost of the chip involved and the packaging issues of the chip. Thus, the type of interrupt errors described above may be impossible to detect. If one processor is processing an interrupt and prematurely receives another interrupt on the same channel from another processor on the integrated circuit, that interrupt may be completely lost leading to problems down the road in the execution of the system's program. Because of the limitations of the number of pins from the integrated circuit, it may not be possible that every interrupt coupling between processors can provide for outside signaling of such errors. Accordingly, to enhance the debugging of highly complex integrated circuits, it is an object of the present invention to provide the means for detecting such interrupt error conditions generated by inter-processor interrupt signaling within a single complex integrated circuit.

SUMMARY OF THE INVENTION

From the foregoing, it can be appreciated that there is a need to provide a mechanism for the monitoring of interprocessor interrupts in complex integrated circuits having multiple processors. Such a mechanism will allow the system designer to detect interrupt errors and aid in the debug procedure during the system development with such integrated circuits. Therefore, it is an object of the present invention to provide an interrupt error detecting mechanism for integrated circuits having multiple processors which internally exchange interrupt signals.

It is also an object of the present invention to provide an interrupt error condition detection mechanism that provides an external signal from the complex integrated circuit indicating the occurrence of an internal interrupt error condition.

It is another object of the present invention to provide information indicating on which interrupt channel of a processor in a complex integrated circuit an interrupt error condition occurred.

These and other objects of the present invention are provided by an interrupt processor controller (IPC) through which all interprocessor interrupts are routed. For processors which receive external interrupts, the interrupt processor controller may receive those interrupts and route those as well to the particular processor thereby not requiring additional ports for the processor. The IPC includes logic which determines when a subsequent interrupt will cause an error condition with a previously unserviced interrupt. When such a condition occurs, a bit is set in an error detect register that is part of the interrupt routing logic. All of the bits of the error detect register are logically OR'ed, the output of which is routed to a single dedicated pin for indicating an interrupt error condition. This dedicated pin may have its signal routed back into the complex integrated circuit for invoking a trap handler or simply light a LED to signal an error. During debug, the error detect register may be checked to determine which bit has been set wherein each bit corresponds to a single interprocessor interrupt channel. Thus, the location of the interrupt error condition in the executing code can be determined to provide the system developer with important information for debugging the system.

The interprocessor interrupt error condition detector of the present invention may also be incorporated on a complex integrated circuit having a plurality of general purpose microprocessors which may be incorporated into a general purpose computer. The operation for debugging the complex processing unit is the same as for the case of dedicated controllers utilizing the interprocessor interrupt error condition detector.

BRIEF DESCRIPTION OF THE DRAWINGS

The objects, features and advantages of the present invention will be apparent from the following detailed description in which.

DETAILED DESCRIPTION OF THE INVENTION

The present invention provides a mechanism for detecting interrupt error conditions in a complicated integrated circuit having a plurality of processors which may send interrupts to one another. In the following description, numerous specific details are set forth such as particular interrupt types and processor types in order to provide a thorough understanding of the present invention. It will be appreciated, however, to one skilled in the art that the present invention may be practiced without such specific details and is generally applicable for interrupt error condition detection in any complicated integrated circuit having a plurality of modules which may signal interrupts amongst themselves. In other instances, well-known control structures and gate level circuits have not been shown in detail in order not to obscure unnecessarily the present invention. Particularly, many functions are described to be carried out by various logic and timing circuits. Those of ordinary skill in the art, having been described the various functions, will be able to implement the necessary logic circuits without undue experimentation.

Figure 1:
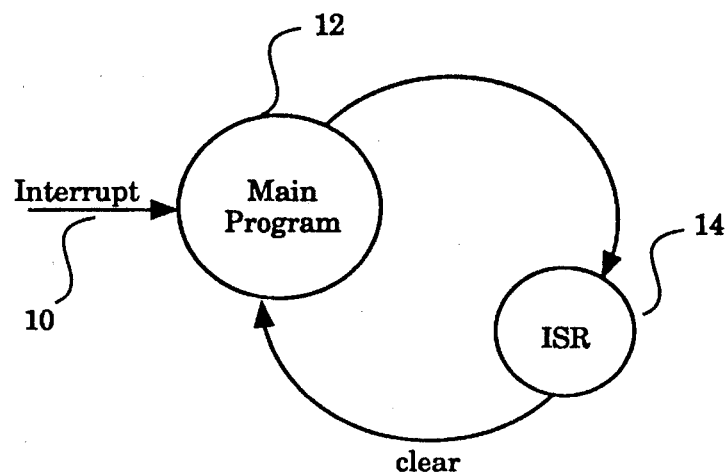
FIG. 1 illustrates the operating routine of a processor which receives an interrupt that requires the processing of an interrupt service routine.

As was described, when a processor receives an interrupt through one of its interrupt ports, the processor temporarily suspends the operation of its current program and executes a routine to service the interrupt. Upon completion of the interrupt service routine, the interrupt is cleared and the previously executing program continues along its way. This is illustrated graphically by FIG. 1 in which a processor is shown to receive an interrupt 10 on one interrupt channel while executing the main program 12. When the processor receives the interrupt 10, the main program 12 is suspended and control of the processor is provided to the interrupt service routine (ISR) 14. After executing, the ISR 14 clears the interrupt and returns control of the processor to the main program 12.

In addition to handling such things as I/O, interrupts are used upon the detection certain system errors of faults. However, at another level, interrupts themselves may be involved in certain error conditions. For example, if a processor has received a first interrupt and is executing the associated interrupt service routine when another interrupt is received on the same interrupt channel, a second interrupt may be lost because the processor may not be equipped to handle the second interrupt at that time. Another interrupt error condition that may occur is a collision between the clear signal indicated by the first interrupt service routine when a second interrupt is received on the same interrupt channel. It is common for most processors to give priority to the clear signal of the first interrupt providing another opportunity where a second interrupt may be lost. The loss of an interrupt may not lead to an immediate noticeable problem but one which propagates until a later time during the execution of the main program. When this occurs it is very difficult to determine the source of the interrupt error condition and difficult for system developers to resolve the problem. Thus, during system debug, when a processor receives conflicting interrupts on the same channel it is desirable to signal the condition so that the system developer may begin debugging at the appropriate point.

With highly complex integrated circuits, the above procedures leading to the debugging of interrupt error conditions may be infeasible. An integrated circuit having more than one processor embedded thereon may not be able to easily indicate the occurrence of an interrupt error condition between processors. Each of the processors may be able to signal interrupts to the other processors within the chip thus providing multiple sources of interrupts to multiple destinations any of which may result in a conflicting or interrupt error condition during system development. When these occur, there may be no way to signal to the external world that such a condition exists because of design constraints and the number of wires and outputs that a densely populated integrated circuit may have. This exacerbates the problem of debugging during the development stage of the processor because interrupts may be lost and the source of the interrupt error condition or conflict may be difficult to determine.

Figure 2:
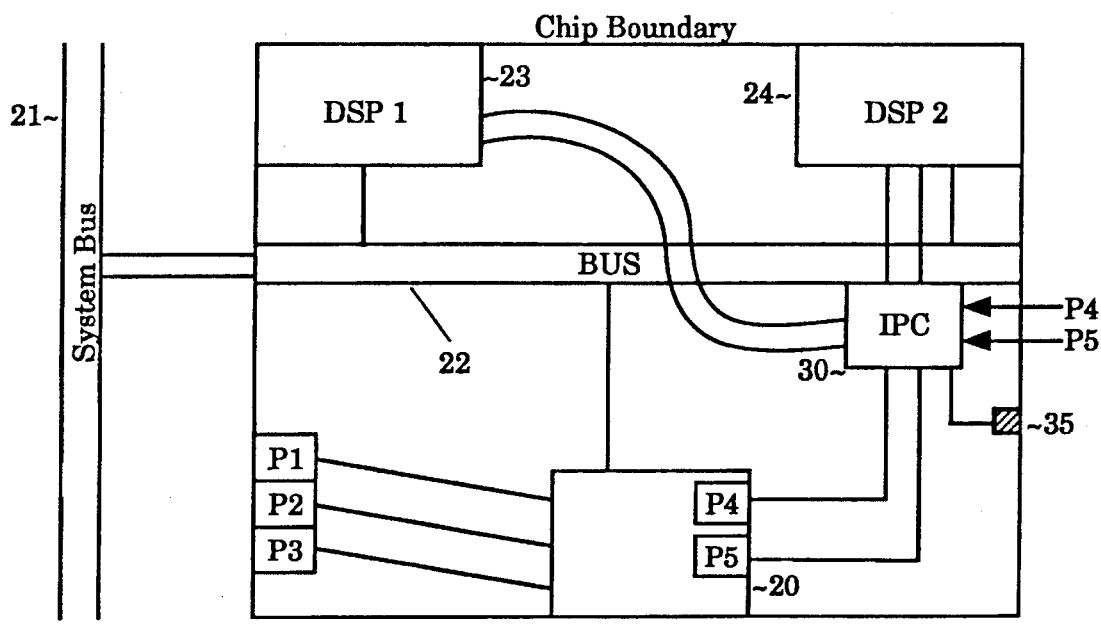
FIG. 2 illustrates a block level diagram of the present invention being incorporated into a complex integrated circuit having a plurality of processors.

FIG. 2 illustrates one complicated integrated circuit having more than one processor incorporated thereon. There is a first processor EX which in the preferred embodiment of the present invention is a core Intel X86 microprocessor which executes the well known Intel Microprocessor Instruction Set. The microprocessor may operate as an embedded controller which is selectively programmable through a system bus 21. The EX processor 20 is coupled to an internal bus 22 for communicating with other parts of the integrated circuit such as memory and timing elements, etc. (not shown).

The integrated circuit of FIG. 2 is considered a complex chip in that in addition to the EX processor 20, there are two additional processors integrated thereon, a first digital signal processor 23 and a second digital signal processor 24. The digital signal processors may be used for numerous functions such as executing real time DSP algorithms. Each of the three processors on the preferred embodiment integrated circuit may at any time need to signal interrupts to the other processors. For example, any memory operations required by the digital signal processors must be carried out by the EX processor 20 thus requiring the propagation of an interrupt signal from the DSP to the EX processor 20. Accordingly, it can be seen that each of these processors may be receiving and transmitting interrupts from and to multiple sources yielding a number of situations where interrupt error conditions may occur. Thus, the integrated circuit of FIG. 2 is equipped with the preferred embodiment interrupt processor controller of the present invention.

In the integrated circuit illustrated in FIG. 2, all interrupts between the multiple processors are routed through the interrupt processor controller 30. The EX processor 20 is provided with five external channel interrupt ports. To provide for additional interrupts, the interrupt processor controller 30 is provided such that it routes signals through interrupt ports 4 and 5 of the EX processor 20. Thus, inputs destined for those interrupt ports are received by the IPC 30 and directly routed to the P4 and P5 interrupt ports of the processor 20. Each of the processors is coupled to the interrupt processor controller 30 through its interprocessor interrupt channels. All interprocessor interrupts are then conveyed through the interrupt processor controller 30.

Figure 3:
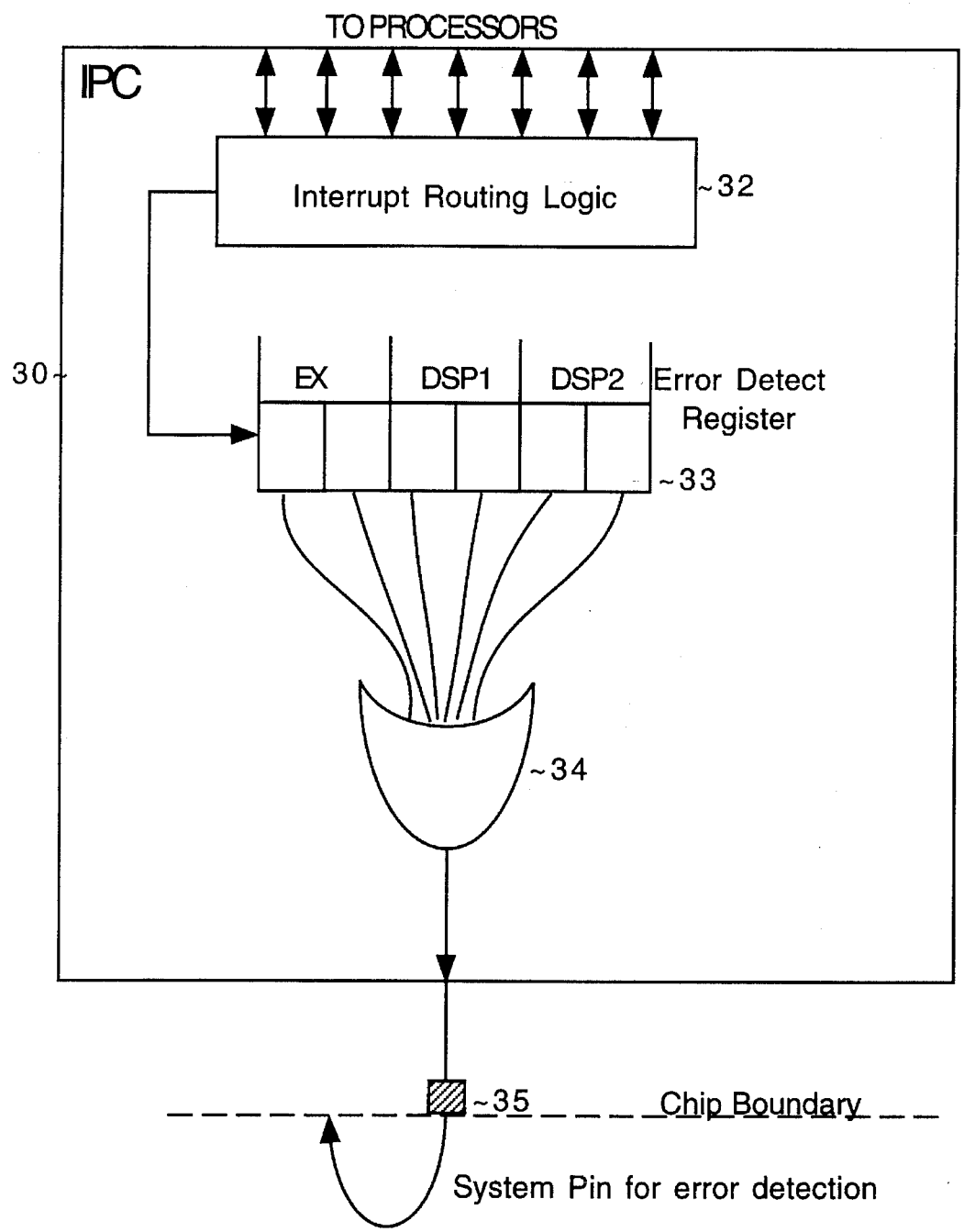
FIG. 3 illustrates a more detailed diagram of the interrupt processor controller in accordance with a preferred embodiment of the present invention.

FIG. 3 illustrates a more detailed description of the interrupt processor controller 30. There is therein circuitry 31 for receiving interrupts destined for the P4 and P5 interrupt channels of the EX processor 20. This circuitry receives those interrupts and routes them to that processor so that the presence of the controller 30 is transparent to non interprocessor interrupt signaling. The other components of the interrupt processor controller 30 are the interrupt routing logic 32, the error detect register 33 and disjunctive OR logic 34.

All interprocessor interrupt signals are received by and propagated from the interrupt routing logic 32. The interrupt routing logic 32 is coupled to the error detect register 33. Initially, all bits of the error detect register 33 are set to zero indicating that no interrupt error conditions exist. The interrupt routing logic 32 receives an interprocessor interrupt from one processor and routes it to the destination processor each of which interconnections define an interprocessor interrupt channel. The interrupt routing logic 32 then monitors for the clear signal from the executing processor indicating that the interrupt service routine executed for that channel has been completed by the receiving processor. If a subsequent interrupt is sent to that processor prior to the receipt of the clear signal by the interrupt routing logic 32, an interrupt error condition has occurred. The interrupt routing logic 32 detects the error condition then toggles one of the bits in the error detect register 33.

In the preferred embodiment of the present invention, the error detect register 33 is provided with a storage bit element corresponding to each inter processor interrupt channel. When the interrupt routing logic 32 activates one of the bits in the error detect register, the activated bit indicates upon which channel the interrupt condition occurred. The OR gate 34 is coupled to all of the bits of the error detect register 33 and provides its output to a dedicated pin at the chip boundary denoted as the syserr pin 35. When one of the bits of the error detect register 33 is set to on, the syserr pin 35 goes active. This active signal on the syserr pin thus indicates that an interrupt error condition has occurred between processors on the complex integrated circuit.

The primary object of the present invention was to provide an indication immediately when such interrupt error conditions occurred and avoid the loss of interrupts due to interrupt error conditions.

There are a number of actions that may be taken when the syserr pin 35 goes active. The signal may be routed back into the integrated circuit to signal a trap handler to stop the processing of the processor so that debugging may commence from the exact point where the interrupt error condition occurred. Further, error handling software may poll the error detect register 33 to determine which bit was set so that the channel of the interrupt error condition may be determined. This provides the system developer with an enhanced ability to debug a complicated integrated circuit having multiple processors. This interrupt error condition detection mechanism may be utilized in embedded controller systems having multiple processors on a single chip as well as for integrated circuits for use in general purpose computers where the processing unit has multiple microprocessors on the same chip or a microprocessor and other processors such as the digital signal processors described in accordance with the preferred embodiment of the present invention.

Figure 4:
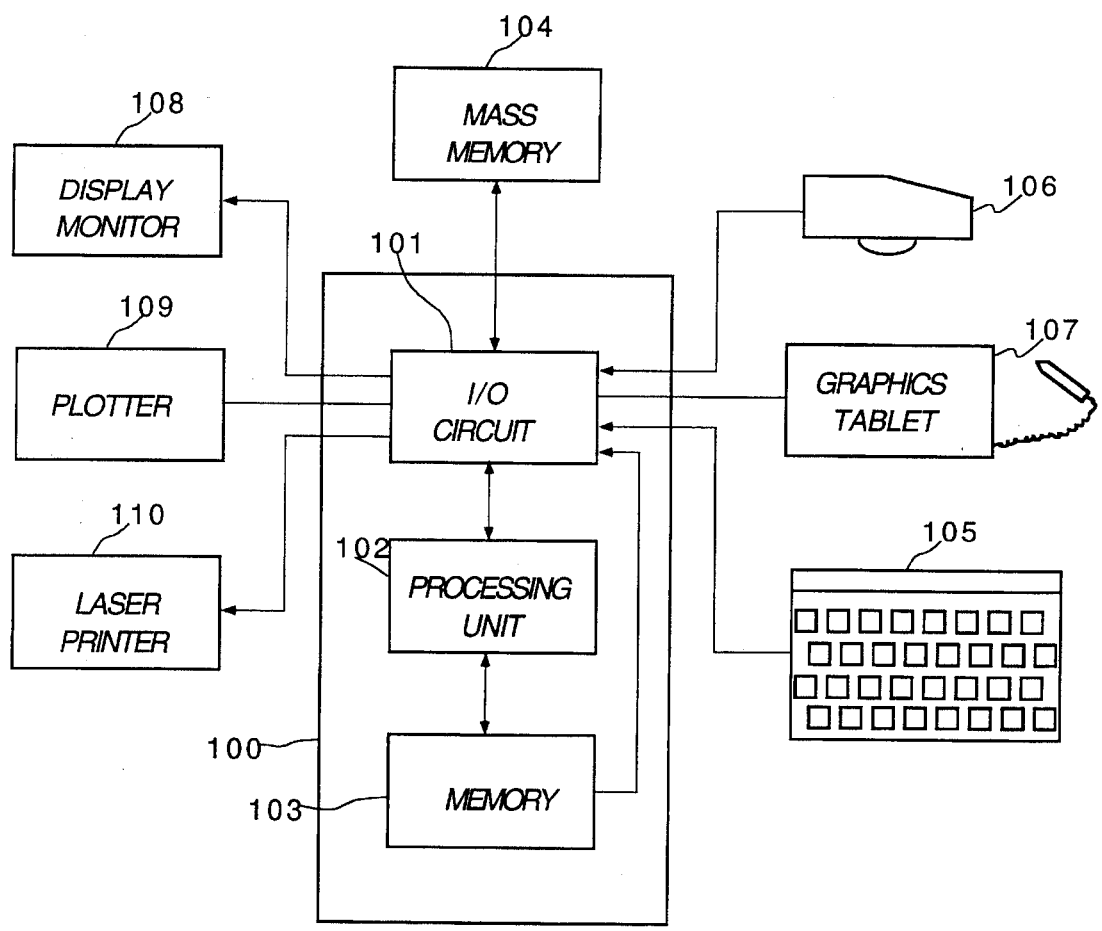
FIG. 4 illustrates a basic computer architecture which may incorporate the present invention in a processing module having multiple processors on a single integrated circuit.

Referring first to FIG. 4, a typical computer system which may utilize a processing unit that implements the present invention. As shown in FIG. 4, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the processing unit 102 and memory 103. These two latter elements are those typically found in most general purpose computers and almost all special purpose computers. In fact, the several elements contained within computer 100 are intended to be representative of this broad category of data processor. Many commercially available computers having differing capabilities may be utilized which incorporate the present invention.

Also shown in FIG. 4 is an input device 105, shown in a typical embodiment of as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs, fonts for different characters and the like and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The present invention interrupt error condition detection mechanism may be incorporated in the processing unit 102. A processing unit that would be a candidate for the present invention would be one in which multiple processors are incorporated into a single integrated circuit package. The present invention interrupt error condition detection mechanism would be used for the processing of interrupts exchanged between the multiple processors of the processing unit 102. A variety of microprocessors may take advantage of the present invention regardless of the instructions that they use or the materials used to fabricate the chip including those made of either silicon or gallium arsenide There has thus been described a method and apparatus for detecting interrupt error conditions on complicated integrated circuits having multiple processors. Although the present invention has been described in terms of preferred and implemented embodiments, it will be appreciated that various modifications and alterations might be made by those skilled in the art without departing from the spirit and scope of the present invention. The invention should, therefore, be measured in terms of the claims which follow.

What is claimed is:

1. An interrupt error condition detector incorporated on a single integrated circuit on a chip, said integrated circuit having a plurality of processors incorporated thereon wherein said plurality of processors signal interrupts to others of said plurality of processors on said integrated circuit, said interrupt error condition detector comprising:

an interrupt processor incorporated on said single integrated circuit, said interrupt processor being coupled to communicate with each of said plurality of processors, wherein interprocessor interrupts are routed through said interrupt processor, said interrupt processor detecting any interrupt error conditions between any of said plurality of processors incorporated on said integrated circuit and including:

interrupt routing logic for receiving interprocessor interrupts from each of said plurality of processors and routing them to an appropriate receiving processor, said routing logic being provided with means for detecting interrupt error conditions;

an error detect register coupled to said interrupt routing logic wherein said interrupt routing logic establishes a logical high bit in said register when said interrupt routing logic detects an interrupt error condition;

means for detecting a logical high bit in said error detect register and providing an active signal on said output signal path in response thereto; and an output signal path coupled to said interrupt processor for said interrupt processor to signal outside of said chip an interrupt error condition when one is detected by said interrupt processor.

2. The interrupt error condition detector of claim 1 wherein each of said plurality of processors comprises a plurality of interrupt channels, said error detect register having a plurality of bits, each of said bits corresponding to one of said interrupt channels.

3. The interrupt error condition detector of claim 1 wherein said interrupt routing logic further comprises means for toggling an error detect register bit corresponding to an interrupt channel where an interrupt error condition is detected.

4. The interrupt error condition detector of claim 2 wherein said means for detecting a logical high bit comprises an OR gate coupled to detect each bit in said error detect register.

5. An interrupt error condition detector incorporated on a single integrated circuit on a chip, said integrated circuit having a plurality of processors incorporated thereon wherein said plurality of processors signal interrupts to others of said plurality of processors on said integrated circuit, said interrupt error condition detector comprising:

an interrupt processor incorporated on said single integrated circuit, said interrupt processor being coupled to communicate with each of said plurality of processors, wherein interprocessor interrupts are routed through said interrupt processor, said interrupt processor detecting any interrupt error conditions between any of said plurality of processors incorporated on said integrated circuit; and an output signal path coupled to said interrupt processor for said interrupt processor to signal outside of said chip an interrupt error condition when one is detected by said interrupt processor, said output signal path comprising a pin for conveying an interrupt error condition detect signal out of said integrated circuit.

6. An interrupt error condition detector incorporated on a single integrated circuit on a chip, said integrated circuit having a plurality of processors incorporated thereon wherein said plurality of processors signal interrupts to others of said plurality of processors on said integrated circuit, said interrupt error condition detector comprising:

an interrupt processor incorporated on said single integrated circuit, said interrupt processor being coupled to communicate with each of said plurality of processors, wherein interprocessor interrupts are routed through said interrupt processor, said interrupt processor detecting any interrupt error conditions between any of said plurality of processors incorporated on said integrated circuit;

an output signal path coupled to said interrupt processor for said interrupt processor to signal outside of said chip an interrupt error condition when one is detected by said interrupt processor, and means for intercepting an external interrupt destined for one of said plurality of processors and routing said external interrupt to a destined interrupt channel.

7. A method of monitoring for interrupt error conditions in a single integrated circuit on a chip having a plurality of processors incorporated thereon wherein said plurality of processors signal interrupts to others of said plurality of processors on said integrated circuit, said method comprising the steps of:

routing all interprocessor interrupts to an interrupt processor controller;

directing interprocessor interrupts from said interrupt processor controller to a destination processor;

monitoring for an interrupt clear signal from said destination processor;

detecting when a subsequent interprocessor interrupt to said destination processor will cause an interrupt error condition by:

determining if a subsequent interrupt for a given interrupt channel is received prior to completion of a previously dispatched interrupt; and determining if a subsequent interrupt for a given interrupt channel is received simultaneously with a clear signal from a previously dispatched interrupt; and signaling that said interrupt error condition exists.

8. The method of claim 7 wherein said signaling step comprises the steps of:

setting a bit in an error detect register to a logical high value;

detecting the logical high value in said error detect register; and propagating a signal out of said integrated circuit indicating that said interrupt error condition exists.

9. The method of claim 8 wherein said setting a bit step comprises setting a bit in said error detect register corresponding to the interrupt channel on which said interrupt error condition exists.

10. The method of claim 8 wherein said detecting the logical high value comprises the step of passing all bit values of said error detect register through an OR gate to determine if any of the bits are set to a logical high value.

11. The method of claim 10 where in said signaling step further comprises setting an external pin on said integrated circuit to active when an interrupt error condition exists.

12. The method of claim 11 further comprising the step of routing an interrupt error condition signal from said pin back into said integrated circuit to be processes by a trap handler.

13. A computer system comprising:

an input/output (I/O) means for providing an communications interface;

a memory means coupled to said I/O means for storing instructions and computer data;

data input means coupled to said I/O means for providing data input and data output to interface with a computer user; and a processing unit coupled to said I/O means for executing instructions and processing computer data, said processing unit being a single integrated circuit on a chip having a plurality of processors embedded thereon wherein each of said plurality of processors signal interrupts to the others of said plurality of processors, said processing unit further incorporating an interrupt error condition detector that comprises:

an interrupt processor incorporated on said single integrated circuit, said interrupt processor being coupled to communicate with each of said plurality of processors, wherein interprocessor interrupts are routed through said interrupt processor, said interrupt processor detecting any interrupt error conditions between any of said plurality of processors the interrupt processor comprising:

interrupt routing logic for receiving interprocessor interrupts from each of said plurality of processors and routing them to an appropriate receiving processor, said routing logic being provided with means for detecting interrupt error conditions;

an error detect register coupled to said interrupt routing logic wherein said interrupt routing logic establishes a logical true bit in said error register when said interrupt rouging logic detects an interrupt error condition; and means for detecting a logical true bit in said error detect register and providing an active signal on said output signal path in response thereto; and an output signal path coupled to said interrupt processor for said interrupt processor to signal outside of said chip an interrupt error condition when one is detected by said interrupt processor.

14. The interrupt error condition detector of claim 13 wherein each of said plurality of processors includes a plurality of interrupt channels, said error detect register having a plurality of bits, each of said bits corresponding to one of said interrupt channels.

15. The interrupt error condition detector of claim 14 wherein said interrupt routing logic further comprises means for toggling an error detect register bit corresponding to an interrupt channel where an interrupt error condition is detected.

16. The interrupt error condition detector of claim 13 wherein said means for detecting a logical true bit comprises an OR gate coupled to detect each bit in said error detect register.

17. A computer system comprising:

an input/output (I/O) means for providing a communications interface;

a memory means coupled to said I/O means for storing instructions and computer data;

data input means coupled to said I/O means for providing data input and data output to interface with a computer user; and a processing unit coupled to said I/O means for executing instructions and processing computer data, said processing unit being a single integrated circuit on a chip having a plurality of processors embedded thereon wherein each of said plurality of processors signal interrupts to the others of said plurality of processors, said processing unit further incorporating an interrupt error condition detector that comprises:

an interrupt processor incorporated on said single integrated circuit, said interrupt processor being coupled to communicate with each of said plurality of processors, wherein interprocessor interrupts are routed through said interrupt processor, said interrupt processor detecting any interrupt error conditions between any of said plurality of processors; and an output signal path coupled to said interrupt processor for said interrupt processor to signal outside of said chip an interrupt error condition when one is detected by said interrupt processor, wherein the output signal path comprises a pin for conveying an interrupt error condition detect signal out of said integrated circuit.

18. A computer system comprising:

an input/output (I/O) means for providing a communications interface;

a memory means coupled to said I/O means for storing instructions and computer data;

data input means coupled to said I/O means for providing data input and data output to interface with a computer user; and a processing unit coupled to said I/O means for executing instructions and processing computer data, said processing unit being a single integrated circuit on a chip having a plurality of processors embedded thereon wherein each of said plurality of processors signal interrupts to the others of said plurality of processors, said processing unit further incorporating an interrupt error condition detector that comprises:

an interrupt processor incorporated on said single integrated circuit, said interrupt processor being coupled to communicate with each of said plurality of processors, wherein interprocessor interrupts are routed through said interrupt processor, said interrupt processor detecting any interrupt error conditions between any of said plurality of processors;

an output signal path coupled to said interrupt processor for said interrupt processor to signal outside of said chip an interrupt error condition when one is detected by said interrupt processor; and means for intercepting an external interrupt destined for one of said plurality of processors and routing said external interrupt to a destined interrupt channel.

* * * * *

UNITED STATES PATENT AND TRADEMARK OFFICE
CERTIFICATE OF CORRECTION

PATENT NO.    :   5,513,346
DATED         :   April 30, 1996
INVENTOR(S)   :   Satagopan et al.

It is certified that error appears in the above-identified patent and that said Letters Patent is hereby corrected as shown below:

Column 1 , line 3 and
In the title page at [54] delete "INTERRUPT" and insert --INTERRUPTS--

Signed and Sealed this

Thirtieth Day of July, 1996

Attest:

BRUCE LEHMAN

*Attesting Officer*    *Commissioner of Patents and Trademarks*